United States Patent [19]
Parks et al.

[11] Patent Number: 4,866,247
[45] Date of Patent: Sep. 12, 1989

[54] APPARATUS AND METHOD OF SHORT CIRCUITING ARC WELDING

[75] Inventors: John M. Parks, Solon; Elliott K. Stava, Brecksville, both of Ohio

[73] Assignee: The Lincoln Electric Company, Cleveland, Ohio

[21] Appl. No.: 270,766

[22] Filed: Nov. 14, 1988

Related U.S. Application Data

[63] Continuation-in-part of Ser. No. 135,832, Dec. 21, 1987, which is a continuation-in-part of Ser. No. 940,580, Dec. 11, 1986, Pat. No. 4,717,807.

[51] Int. Cl.$^4$ .............................................. B23K 9/09
[52] U.S. Cl. .......................... 219/137 PS; 219/130.21
[58] Field of Search ..................... 219/137 PS, 130.21

[56] References Cited

U.S. PATENT DOCUMENTS

| | | | |
|---|---|---|---|
| 3,459,920 | 8/1969 | Sevenco | 219/130.21 |
| 3,792,225 | 2/1974 | Needham | 219/130.21 |
| 3,809,853 | 5/1974 | Manz | 219/137 |
| 4,020,320 | 4/1977 | Pijls | 219/137 PS |
| 4,544,826 | 10/1985 | Nakanishi et al. | 219/137 PS |
| 4,546,234 | 10/1985 | Ogasawara | 219/137 PS |
| 4,717,807 | 1/1988 | Parks | 219/130 |
| 4,794,232 | 12/1988 | Kimbrough et al. | 219/130.51 |

FOREIGN PATENT DOCUMENTS 1565157  2/1970  Fed. Rep. of Germany .

OTHER PUBLICATIONS

A Power Source for Advanced Welding Systems, by P. Budai et al., First International Conference on Advanced Welding Systems, 11/85.

A Power Source for Gas Shielded Arc Welding with New Current Wave Forms, by T. Ogasawara et al, First International Conference on Advanced Welding Systems, 11/85.

Control of Short Circuiting in MIG Welding, P. Boughton et al, Welding Research International, 1974 Ed.

Patent Abstracts of Japan, vol. 10, No. 83 (M-466), [2140], Apr. 2, 1986.

Patent Abstracts of Japan, vol. 9, No. 202 (M-405), [1925], Aug. 20, 1985.

Patent Abstracts of Japan, vol. 4, No. 161 (M-40), [643], Nov. 11, 1980.

Study of Welding Arc Control in China, by J. L. Pan, 231 Welding Journal, 65 (1986) Mar., No. 3, Miami, FL U.S.A.

European Search Report, Application Serial No. 87302155.4, Apr. 28, 1988.

*Primary Examiner*—Clifford C. Shaw
*Attorney, Agent, or Firm*—Body, Vickers & Daniels

[57] ABSTRACT

Apparatus and method to reduce spatter and allow better semi-automatic welding in short circuiting arc welding of the type using a single D.C. power supply for causing a welding current to pass through a welding wire extending variable distances from a holder and between the welding wire and a workpiece at a molten metal pool on the workpiece. The welding current flows in response to an arc voltage while the welding wire is fed from the holder toward the workpiece whereby the welding wire is subjected to a succession of welding cycles each of which include an arcing condition during which the wire is spaced from the pool and a short circuit condition during which a molten metal ball formed on the end of the wire contacts the metal pool and then transfers from the wire to the workpiece by a necking action. In this type of welding operation, the invention involves the application of a preselected amount of energy into the wire during the arcing condition for each welding cycle, which preselected amount of energy slightly exceeds the known value of energy necessary to melt a given volume of metal to form a consistent molten metal ball onto the end of the wire. This constant energy is divided between the resistance heating of the wire extending from the wire holder and the anode heating caused by the arc during each arcing condition of a cycle. Consequently, constant energy is inputted to the end of the wire irrespective of changes in the amount of wire extension or stickout.

45 Claims, 5 Drawing Sheets

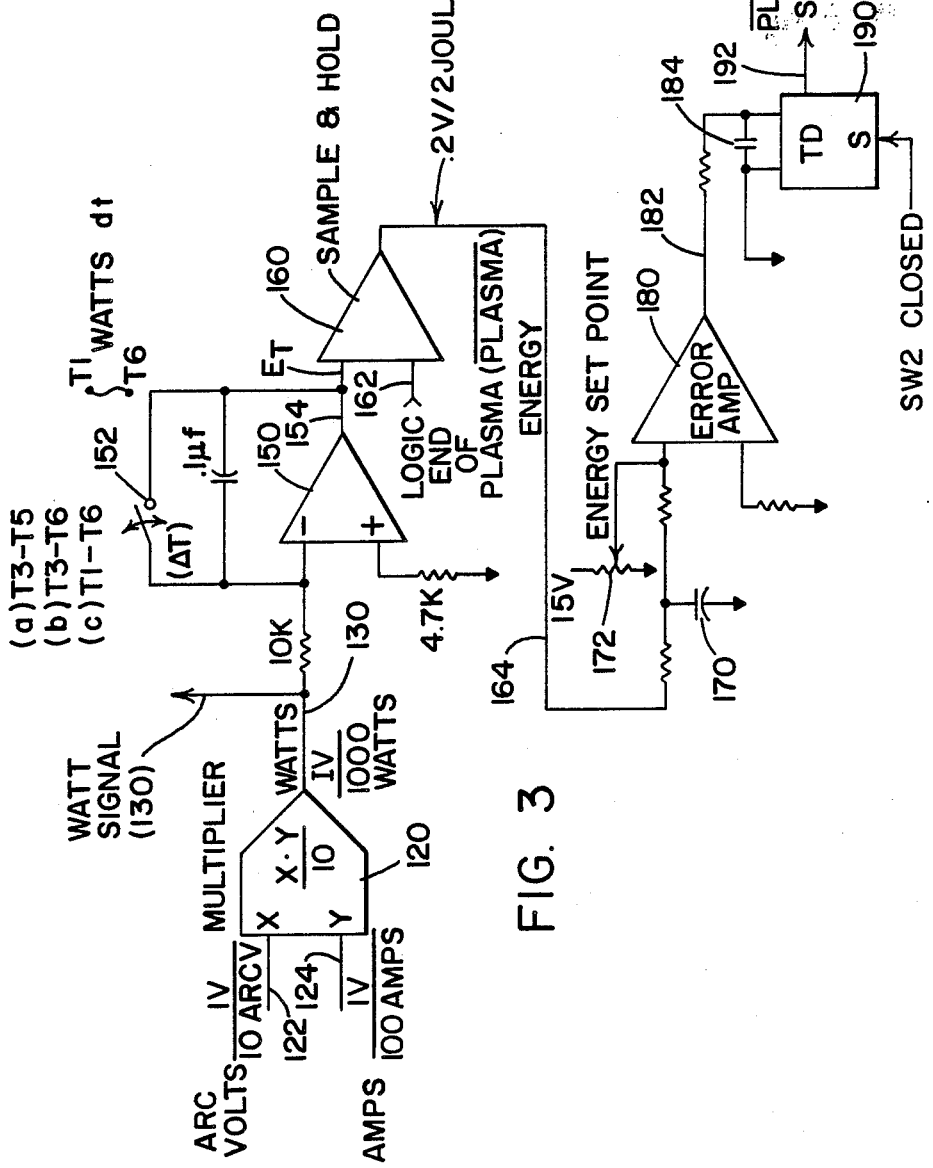

$E_T = I_d^2 R \cdot t + E_{arc}$ $E_T = K$

APPARATUS AND METHOD OF SHORT CIRCUITING ARC WELDING

This application is a continuation in part of prior copending application Ser. No. 135,832 filed Dec. 21, 1987, which in turn is a continuation-in-part of prior application Ser. No. 940,580, filed Dec. 11, 1986, now U.S. Pat. No. 4,717,807.

This invention relates to the art of arc welding using a consumable electrode and more particularly to an improved apparatus and method of short circuiting arc welding.

INCORPORATION BY REFERENCE

The present invention relates to an improvement in spatter control systems of the general type described in applicant's prior application Ser. Nos. 940,580 filed Dec. 11, 1986 and 4,717,807 issued Jan. 5, 1988. The prior application and patent are incorporated by reference herein as background information and for their discussion of concepts in the spatter control area to which the present invention is specifically directed. In addition, Pijls et al U.S. Pat. No. 4,020,320, relating to short-circuit arc welding with a constant bead, is also incorporated by reference herein.

BACKGROUND

In recent years, a substantial amount of effort has been devoted to improving short circuiting arc welding by controlling the welding current and/or arc voltage during different portions of a welding cycle constituting a short circuit condition followed by an arcing condition. During the short circuit condition, a molten metal ball formed on the end of the advancing welding wire engages the molten metal pool on the workpiece causing a high current flow through the consumable welding wire and molten metal ball. This short circuit condition is terminated by an electrical pinch action causing the metal forming the molten ball on the wire to electrically constrict and then break away from the welding wire in an explosion type action often referred to as a "fuse" or "the fuse". Controlling current flow during the short circuit portion of the welding cycle is accomplished by the power supply control circuit. In addition, a premonition circuit is usually provided so that a given increase in dv/dt signals the imminent formation of the fuse. Consequently, the welding current can be dropped to a background level $I_B$ or lower immediately before the fuse occurs. In this fashion, the energy of the fuse during each welding cycle is drastically reduced. This reduces spatter at the termination of the short circuit condition. Various circuits for controlling the current flow during the short circuit portion or condition of the welding cycle are known in the art as spatter control circuits since the fuse is considered to be the primary source of spatter during short circuiting arc welding. In applicant's two copending applications, incorporated by reference herein, other spatter producing dynamics of the welding process were recognized and prevented or modified by novel control concepts. One aspect developed by applicants was to provide a high energy pulse following a slight time delay after the fuse so that the arcing condition subsequent to the fuse could be initiated by a high energy current pulse sometimes referred to as a "plasma boost" pulse. By using a high energy plasma boost current pulse immediately upon initiation of an arcing condition in the welding cycle, melting by anode heating at the tip of the welding wire being fed toward the molten metal pool on the workpiece occurred rapidly. This rapid melting allowed formation of a molten metal ball on the end of the wire of uniform size which was then moved toward the pool of molten metal as the wire was fed toward the workpiece. After the plasma boost pulse of current, a background current $I_B$ was passed through the arc to maintain the molten condition of the molten ball. By controlling the current and using a fixed time for the plasma boost pulse, the energy in the plasma boost pulse was regulated. The end of the wire was melted to form a molten metal ball having a somewhat uniform size based upon an amount of energy applied during the power boost current pulse. Thereafter, the arc was operated at a background current level maintaining a molten condition until the short circuit occurred.

Utilizing these prior concepts, which have indeed substantially reduced spatter, a constant voltage control circuit during the plasma boost pulse caused a high current flow during the pulse. This tended to drive the pool away from the inwardly moving molten metal ball. Should the pool be shifted by the energy of the arc, a slight contact could occur at a location spaced from the center of the arc. This short during the plasma boost pulse caused a relatively large spatter event. Thus, using a constant voltage for the power boost current pulse allowed a high current to drive the pool away from the ball which, by fluid dynamics, sometimes tended to cause a wave effect resulting in momentary shorts. To overcome this difficulty, a variable voltage power control circuit has been suggested to maintain a constant current during the plasma boost current pulse. This concept increased the frequency of random shorting during the arcing condition, but each short had a lesser amount of energy to be released. The variable voltage concept employing a constant current condition allowed momentary shorts of less energy. In summary, using constant current or constant voltage during the power boost cycle either increased the frequency of momentary shorts during the arcing condition or their ferocity.

By using a plasma boost pulse having a fixed time, a different amount of energy was introduced into the molten metal ball as the stick-out of the consumable electrode or welding wire varied. Thus, prior systems employing fixed time in the plasma boost current pulse could be used for automatic welding; however, semi-automatic welding wherein manual manipulation changed the extension presented difficulty. The plasma boost current pulse sometimes did not create enough heating on the end of the wire for melting. This caused stubbing. In addition, the duration of the welding cycle was not constant over long periods of time since there was substantial variations in the initiation of the short circuit condition of the individual cycles.

THE INVENTION

The present invention relates to an improvement in short circuiting arc welding which results in a substantially constant welding cycle time, reduced spatter and automatic compensation for variable extension or stick-out during semi-automatic welding in the short circuiting mode.

In accordance with the present invention, there is provided an improved apparatus or system for short circuiting arc welding of the type using a D.C. power supply for causing a welding current of different levels to pass through the welding wire extending variable distances from an electrode holder and between the wire and the workpiece at the molten metal pool on the workpiece. The current flowing during the welding process is in response to the voltage between the holder and the workpiece. In accordance with the invention, there is means for applying a preselected energy to the welding wire during a selected portion of each arcing condition of the welding cycle where the preselected energy exceeds the given value of energy necessary for melting the end of the wire preparatory to forming a molten metal ball of a given size for short circuiting metal transfer. The selected portion of each arcing condition during which a constant energy is applied is the fixed time plasma boost current pulse together with an additional plasma current pulse. This plasma pulse is terminated at an adjusted time to create a constant energy input to the wiring during the plasma boost and subsequent plasma portion of the welding cycle. Thus, during each welding cycle a selected constant amount of energy is applied to the wire for heating of the wire during each cycle. Such wire heating is divided into resistance heating by current flow through the wire from the holder to the end of the wire and anode heating at the end of the wire by the effective arc current. Such anode heating contributes a majority of the melting energy applied to the wire during each welding cycle. As the extension or stick-out increases, a larger portion of the heating per cycle is resistance heating caused by current flow through the welding wire. By employing a fixed constant energy input during the arcing condition for each welding cycle, the system automatically compensates for different stick-out conditions. As the stick-out increases, more heating is by resistance heating in the wire. As the stick-out decreases, less heating is by resistance heating of the wire. In all instances, a constant energy is applied so that there is automatic adjustment of the amount of $I^2R$ heating preparatory to the wire reaching the end portion where it is melted into a ball. Since the welding cycles occur between 30–100 cycles per second, each increment of advancing wire, defined as the amount of advance during a given welding cycle, includes an accumulation of heat energy applied to the increment during all cycles prior to the time the increment reaches the bottom of the wire. Any change in stick-out occurs at a substantially lower rate than the accumulation of heat energy during each welding cycle in individual increments of the advancing wire. Since the welding operation is substantially faster than the rate of any change in stickout or extension from the holder, each increment essentially has the energy which when combined with the actual energy of the anode heating during each cycle results in a fixed energy input to the last increment of wire being actually melted. Changes in stick-out are gradual in comparison to the normal operation of the system so that a constant energy is developed in the molten metal ball during each welding cycle. The ball is a fixed size and spatter is reduced by concepts which are applicable to semi-automatic operation.

In accordance with a more limited aspect of the invention, the energy controlled current pulse has a first occurring portion, known as the plasma boost portion, employing a relatively high current level and a second occurring portion, known as the plasma portion, employing a lower second current level substantially above the background current. The plasma boost portion of the arcing cycle has a fixed time so a selected energy is applied during this portion of the welding cycle. However, the plasma portion used to finalize the melting of the ball, after the high energy plasma boost pulse of current, has a variable length which is terminated during each cycle at a time to produce a fixed actual energy applied to the wire during each welding cycle. By using this concept, changes in the length of the extension occurring at the rate experienced during welding do not change the total energy consumed by the wire by the last increment being melted for forming the molten metal ball on the end of the wire preparatory to the short circuit condition in the welding operation.

To terminate the plasma portion of the welding cycle during the arcing condition there is provided means for creating a watt signal as the instantaneous product of the arc voltage and welding current for the welding process. By integrating this signal from the start of the plasma boost pulse, the accumulated totalized energy value reaches a preselected level which is employed for terminating the high plasma current. Thereafter, a low background current is used to maintain the molten metal ball until it reaches the molten metal pool on the workpiece for creating the short condition of the welding cycle. Thus, the invention employs a high current plasma boost pulse followed by a plasma portion, also at high current, until a fixed amount of energy has been accumulated during a welding cycle. When this occurs, the energy required to melt the ball has been reached. The background current maintains the size and temperature of the ball.

As the extension gradually changes, the amount of energy consumed by resistance heating through the wire changes. This phenomena does not affect the ultimate heating at the end of the wire. As more heating occurs in the wire advancing toward the workpiece, less heating occurs by anode heating by the arc. In accordance with the invention, the heating is terminated at a fixed energy level which is the energy level just above the energy necessary for converting the last increment of metal into a molten metal ball. For instance, if the volume of metal requires 7.2 Joules for melting the last increment, the energy cutoff employed in the present invention would be slightly greater than that amount, such as about 7.25 Joules.

In accordance with another aspect of the present invention, the D.C. power supply for controlling the current flow during the welding cycle employs a high frequency pulsing circuit, such as a pulse width modulator D.C. chopper operated at a high frequency, such as greater than 10 KHz and, preferably, approximately 20 KHz. In this fashion, all aspects of the welding cycle are controlled and updated many times during each welding cycle. There is no appreciable lag in compensating for gradual changes in extension or stick-out. The total energy directed to the ball at the end of the wire preparatory to short circuiting is fixed. This constant energy value does not change as gradual stick-out changes. In view of the high frequency of the input power control device employed in accordance with the preferred embodiment of the present invention, real time operation creates the same energy in the melted, last increment irrespective of gradual changes in the number of increments constituting the extended portion of the welding wire.

In accordance with another aspect of the invention, the high energy plasma boost current pulse is controlled to produce a constant watt condition for at least a major portion of the plasma boost pulse. This overcomes the difficulties experienced in a constant current or constant voltage mode of operation and is done by employing the system used for controlling the energy during each welding cycle. This system creates a watt signal which adjusts the current pulses gated by the pulse width modulator D.C. chopper. This concept results in a constant watt condition during the plasma boost pulse. Thus, the plasma boost pulse is a constant watt pulse having a fixed time. The energy cutoff time is controlled during the subsequent arc plasma mode of operation.

In accordance with another aspect of the present invention, there is provided a method for short circuiting arc welding of the type employing the system defined above. A current pulse is created upon initiation of the arcing condition wherein the current pulse has a first occurring portion, or plasma boost portion, and a second occurring portion, or plasma portion. The energy is totalized during these two monitored current portions of a single welding cycle. This current pulse is terminated so the totalized energy has a preselected value greater than a given value. The given value is the energy necessary to melt the last increment at the end of the wire to form a preselected molten metal ball. Thereafter, a low level background current is applied between the wire and the workpiece until the next short circuit condition occurs. In accordance with the preferred embodiment, the energy is obtained by creating a watt signal as the instantaneous product of the arc voltage and welding current, integrating this watt signal and accumulating the value of the integration until a preselected constant energy has been reached.

In accordance with another aspect of the invention the current during the plasma boost current pulse is selected to produce a plasma umbrella at the tip of the electrode or wire. Consequently, this causes a large plasma jet extending transversely of the direction of welding to heat a wide area of the plate to a surface melting condition. The molten weld metal will metallurgically bond to the plate and spread over the wide area without "cold shutting." Then the current is lowered for the plasma portion of the cycle to produce a generally conical arc.

The energy cutoff can occur by creating a differential signal to change the length of the plasma portion of the current pulse or by an actual cutoff signal. In each instance, this concept is defined as terminating the current pulse of the welding cycle when the totalized energy reaches a preselected value greater than the given melting value. This cutoff is accomplished in the preferred embodiment by selecting a time differential in a time delay circuit. It can be done by an actual cutoff signal when the energy reaches a preselected accumulated value. The second approach operates on the cycle being processed.

The present invention controls the total energy applied during the plasma portion of the arcing condition of a given welded cycle and causes operation of many spatter control apparatus, systems and/or methods in a manner that compensates for variable extensions such as experienced in semiautomatic welding. Apparatus, systems and/or methods in the past for spatter control have been successful primarily in automatic welding operations. Less success was found in semi-automatic operations since the end of the wire was not always melted properly during a given cycle. Consequently, the primary object of the present invention is the modification or improvement of a short circuiting arc welding apparatus and/or method having a spatter control feature, which improvement allows use of the apparatus, system and/or method in a semi-automatic operating mode, as well as in an automatic operating mode.

A secondary object of the invention is controlling the plasma boost current pulse at the start of the arc condition in a given cycle to provide a constant watt pulse. This overcomes the disadvantages experienced in constant voltage control systems and variable voltage, constant current control systems. In accordance with this object of the invention, less spatter is created during the plasma boost current pulse.

Another object of the present invention is the provision of an apparatus, system and/or method, which apparatus, system and/or method employ a constant energy control during the arcing condition of the welding cycle to compensate for variations in stick-out or extension of the welding wire and use of a watt signal for energy control and to control the current level during the plasma boost current pulse to reduce random spatter.

A further object of the present invention is the provision of an apparatus, system and/or method wherein the same total energy is applied to the welding wire in the last wire increment to assure formation of a molten metal ball, irrespective of the amount of extension of the wire for the holder. A welding operator, therefore, does not need to adjust the wire extension accurately and adroitly to obtain the benefits of newer spatter control circuits.

Yet another object of the present invention is the provision of an apparatus, system and/or method, which apparatus, system and/or method control the energy applied to the end of the welding wire in a short circuiting arc welding operation to create a uniform repetitive cyclic operation with reduced spatter.

Still a further object of the present invention is the provision of an apparatus, system and/or method for short circuiting arc welding using a plasma boost current pulse at the start of the arcing condition of a given cycle, wherein the current level of the plasma boost pulse is controlled to produce a constant instantaneous watt value for the plasma boost pulse. This watt value is monitored and adjusted many times during each plasma boost current pulse by using a high frequency input power supply such as a pulse width modulator controlling a power switch.

Yet another object of the present invention is the provision of an apparatus, system and/or method, as defined above, which apparatus, system and/or method employs a D.C. power supply using a plurality of high frequency pulses modulated in width to control the current at various times during the welding cycle.

Yet another object of the present invention is the provision of an apparatus, system and/or method, as defined above, which apparatus, system and/or method employed an instantaneous watt signal that is integrated and accumulated for setting the heat energy during a welding cycle. This same signal is employed, without integration, for controlling the power supply so the current level during the plasma boost current pulse maintains a constant instantaneous watt level.

Still a further object of the present invention is the provision of an apparatus, system and/or method for short circuiting arc welding which regulate the total energy employed during the arcing condition for each welding cycle.

A further object of the present invention is the provision of an apparatus, system and/or method of short circuiting arc welding where a constant energy concept during the arcing condition is employed for maintaining an essentially constant cycle length. This object prevents premature initiation of the short circuit condition to maintain the essentially constant welding conditions during each cycle.

These and other objects and advantages will become apparent from the following description taken together with the accompanying drawings.

BRIEF DESCRIPTION OF DRAWINGS

FIG. 3 is a wiring diagram illustrating the preferred embodiment of the present invention for creating the watt signal and for creating an accumulated energy signal to control the amount of energy directed to the welding wire during a single welding cycle;

FIG. 4 is a representative timing pulse at the output of the circuit shown in FIG. 3;

PREFERRED EMBODIMENT OF THE PRESENT INVENTION

Figure 1:
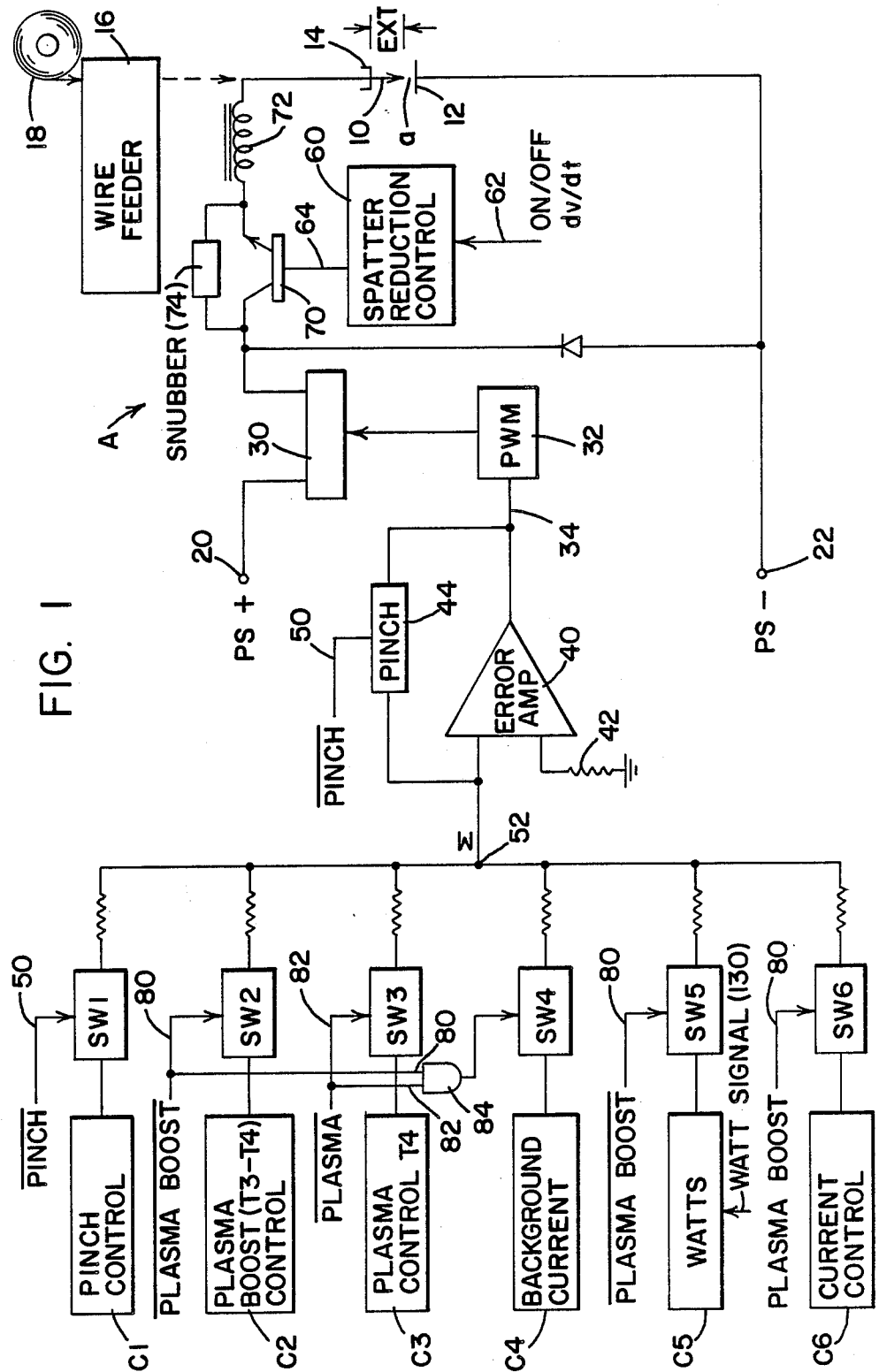
FIG. 1 is a combined block diagram and schematic wiring circuit showing the preferred embodiment of the present invention.

Referring now to the preferred embodiment of the invention only, and not for the purpose of limiting same, FIGURE 1 shows apparatus A for short circuiting welding using control circuits to accomplish reduced spatter in a manner described in prior application Ser. No. 135,832 filed December 21, 1987. The present invention relates to an improvement in short circuiting arc welding of the type performed by apparatus A with a novel concept performed by a preferred circuit shown in FIG. 3. Apparatus A, as shown in FIG. 1, is illustrative in nature and includes a power supply input scheme using various distinct current controls for creating separate current portions of a cycle for short circuiting arc welding. Welding wire 10 is spaced from workpiece 12 while being supported in an electrical connector or holder 14. Wire 12 can be driven through holder 14 by an appropriate wire feeder 16 from a supply spool 18 at a rate determined by the operator. Holder 14 is connected to one terminal of a D.C. power supply PS. The amount of wire extending from the holder and above arc a defines the extension or stick-out for welding wire 10. Power supply PS includes a positive output terminal 20 and a negative output terminal 22 in accordance with standard practice. Power switch 30 is cycled at approximately 20 KHz by pulse width modulator 32 of standard design having a control line 34. Consequently, the voltage on the control line 34 indicates the width of the 20 KHz current pulses allowed to pass through switch 30. In this manner the welding current through welding wire 10 and across arc a is controlled by the various input control circuits C1-C6 used separately or jointly as will be explained. The pulse width controlling voltage on line 34 is the D.C. voltage level at the output of an error amplifier 40 appropriately biased by resistor 42. An override or parallel circuit 44 is operated in response to the logic on inverted PINCH line 50. The input of both error amplifier 40 and circuit 44 is the voltage at summing junction 52 which is controlled by a series of switches SW1-SW6 at the output side of control circuits C1-C6. The upper circuits C1-C3 are used in conjunction with lower circuits C5, C6 to feed and draw current from junction 52 so the current drawn from the error amplifier controls the voltage on modulator 32. Background current is maintained at low level $I_B$ by joint closing of switches SW4, SW6. In accordance with prior practice, spatter control circuit 60 is operated in response to an impending fuse by a signal in line 62. This fuse signal is created by a dv/dt premonition circuit so that the logic on output line 64 will render power switch 70 non-conductive immediately before a fuse is created during a short circuit condition. Operation of switch 70 changes the flow of welding current through choke or inductor 72 from a high level current through switch 70 to low level current through a snubbing circuit 74. As the short circuit portion of a cycle progresses, a standard dv/dt circuit, not shown, starts to monitor the arc voltage. When dv/dt exceeds a set value indicative of an impending fuse the logic on line 62 shifts. The voltage of line 64 renders switch 70 non-conductive. The welding current from switch 70 is shifted to a low level to reduce the energy released by the fuse to reduce spatter. This concept does not form a part of the improvement constituting the present invention which is operative during the arc condition of the welding cycle.

Figure 2:
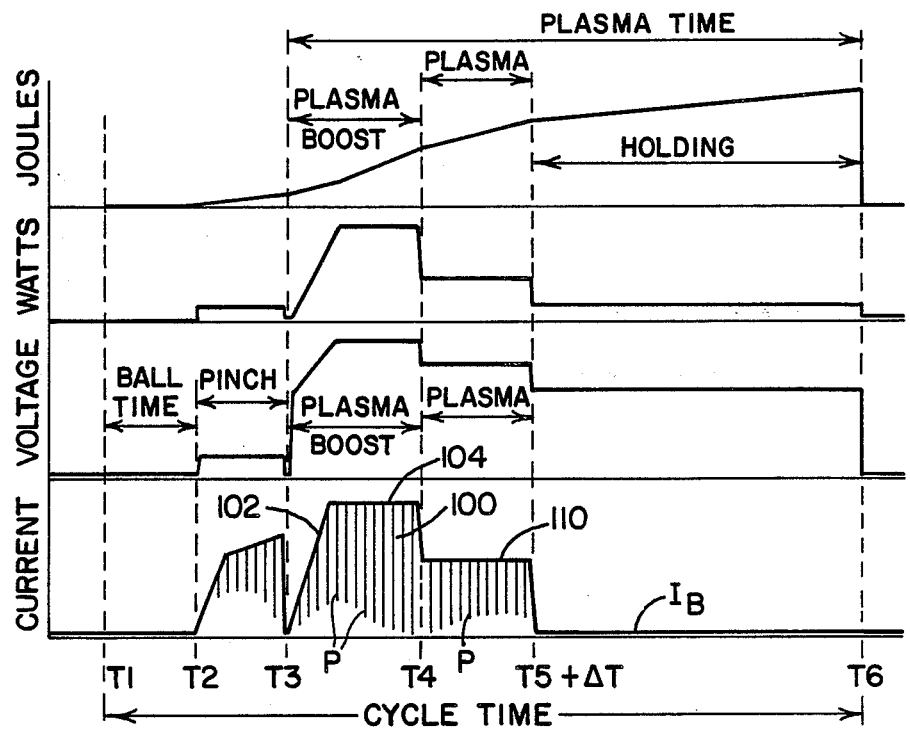
FIG. 2 is a series of graphs together with a table of features employed in the preferred embodiment of the present invention.
Figure 9:
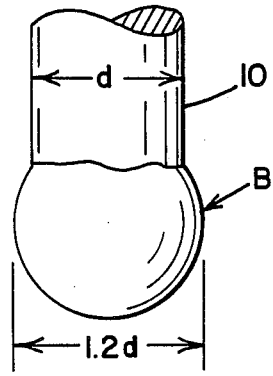
FIG. 9 is a partial view showing the increment at the end of a welding wire preparatory to short circuiting; and, FIG. 10 is a graph illustrating an operating characteristic used to explain the present invention.

The width of the high frequency pulses allowed to pass through switch 30 by the output of pulse width modulator 32 is determined by the voltage at summing junction 52, which voltage is controlled by switches SW1-SW6 operated in accordance with standard procedure for controlling the welding current at various portions of the total welding cycle best shown in FIG. 2. The welding cycle is illustrated as extending between positions T1-T6. As will be explained later, variations can be made on this scheme of operation in accordance with the preferred embodiment of the present invention. To illustrate the function of switches SW1-SW6, the cycle time or cycle is assumed to start at time T1. At that time, a molten metal ball B shown in FIG. 9 is formed on the end of wire 10 and the wire is moving toward the molten metal pool formed on workpiece 12. Since the plasma boost pulse and plasma pulse are not yet created, the logic on input lines 50, 80, 82 of AND gate 84 deactivate switches SW1, SW2, SW3 and SW5 while activating switches SW4 and SW6. Consequently, the background current control C4 is operative. This control circuit combines with the output of current control switch SW6 driven by current control circuit C6. The pulse width of the 20 KHz pulses through switch 30 are thus at a background current level $I_B$. Detection of a short causes a logic on inverted PINCH line 50 causing switch SW1 to take over control of the current flow through the PINCH modified feed back circuit 44. The pulse width modulator 32 is controlled by circuits C1, C6 during the short circuit condition. A high welding current tends to flow due to the short condition. The pulse width modulator attempts to limit the current magnitude as illustrated in the PINCH portion of FIG. 2. The illustrated and preferred embodiment has two distinct slopes; however, other forms of the PINCH pulse could be controlled by circuit C1. As soon as a fuse is about to occur, the logic in line 62 changes. This opens switch 70 causing the current to be drastically reduced through use of snubber 74. This is illustrated at time T3 in FIG. 2. The background current $I_B$ can be the same as this low level; however, in the illustrated embodiment, $I_B$ is controlled by circuit C4 and is not identical to the current at time T3. Immediately thereafter, a standard plasma boost current pulse 100 is created. This pulse is controlled by switch SW2 closed in response to a logic change in line 80. Since the PINCH condition does not remain, switch SW1 is off and bypass circuit 44 is deactivated. Thus, during the plasma boost current pulse condition 100, switch SW2 allows circuit C2 to control pulse width modulator 32 for controlling the welding current pulses through switch 30. In the illustrated embodiment, plasma boost current pulse 100 includes a leading edge 102 controlled by the plasma boost control C2 and then an upper portion 104 also controlled in the circuit C2. In the preferred embodiment of the invention, the upper portion 104 is a constant watt portion instead of a constant current control illustrated in FIG. 2. When apparatus A is to control the plasma boost pulse with a constant power, switch SW5 is closed so that the instantaneous watt signal is monitored by circuit C5 which produces an input to junction 52 through switch SW5. During constant power operation current control circuit C6 is deactivated by a logic in line 80 that opens switch SW6.

In accordance with the preferred embodiment of the invention, during the standard plasma boost current pulse, the current flow through switch 30 is controlled by circuits C2, C5 to produce a constant instantaneous watt, which is updated at the sampling rate of 20 KHz. During the other portions of the welding cycle, watt signal control circuit C5 is inoperative so that there is, then, a current control control through switch SW6 and input circuit C6. At a fixed time T4, plasma boost current pulse 100 is terminated by control circuit C2. Current control is shifted from circuit C5 to circuit C6. At this time, switch SW3 applies the output of plasma control circuit C3 to modulator 32 so that the high current flow started at time T3 when the arcing condition comes into existence following a fuse includes a first occurring plasma boost portion 100 and a second occurring plasma portion 110. The high current of the plasma portion controlled by circuit C3 is terminated at time T5. The integrated area of pulses 100, 110 is the total energy applied to wire 10 during the welding cycle between times T1–T6. After the high current plasma pulse 110, switch SW4 is again closed so that background current control circuit C4 takes over operation of error amplifier 40.

In summary of the operation of a welding cycle, at time T2 there is a short circuit when the molten metal ball B contacts the molten metal in the pool on workpiece 12. When that occurs, a PINCH control circuit C1 controls switch 30 through switch SW1 and parallel branch or circuit 44. Direct control of the current flow is needed to limit flow during the short condition. An imminent fuse causes a signal in line 62. This terminates the PINCH cycle at time T3. Switch 70 is opened and snubber 74 is placed in series with choke 72. Thereafter, the arcing condition occurs which commences with a plasma boost current pulse 100 followed by a plasma current pulse 110. The plasma boost current pulse 100 has a fixed time T3–T4 and the plasma current pulse 110 is terminated at time T5. In accordance with the invention, the energy provided for the welding operation during pulses 100, 110 is constant. This is accomplished by adjusting the time T5 indicated to be a subtraction or addition to time T5. As will be explained later, the termination of a plasma pulse, or second occurring portion of the total current pulse between times T3–T5, is done so that a constant energy is employed during each arcing condition of the welding cycle. The energy produced during the PINCH and background cycles is not calculated. It is disregarded since this energy does not provide a control function and is somewhat minor in that it only creates resistance heating in wire 10 for relatively short period of time and at low power.

FIG. 2 illustrates the current, voltage, watts and accumulated Joules in somewhat straight line fashion for illustrative purposes. In addition, the HOLDING portion of the welding cycle, occuring after the two high plasma current portion of the cycle, could include a third high current energy supply pulse which combines with current pulses 100, 110 to create the desired amount of accumulated energy during the arcing condition. When that occurs, pulses 100 and 110 would both have a fixed time. The holding cycle would then have a further current pulse which would cause the circuit to shift to the background level at time T6. In that instance, time T6 is adjusted to control the total energy applied to the wire during the arcing condition. In the preferred embodiment of the invention, only two current pulses form the high current used to heat wire 10 during the arcing condition. However, a third high current condition could exist which is labeled "holding" in the upper graph of FIG. 2. In the preferred embodiment, leading edge 102 of pulse 100 is essentially vertical and portion 104 is horizontal, but controlled at a constant power by adjusting the current and allowing the voltage to fluctuate accordingly. Only a watt control is used. The graphs of FIG. 2 are only representative in presentation. Vertical lines P in the lower current graph of FIG. 2 illustrate the 20 KHz frequency of switch 30. Switch 30 operates many times during a welding cycle between times T1–T6. Thus, accurate and real time control is exercised over the current flow from power supply PS through switch 70 to the welding station determined by welding wire 10 of workpiece 12. As so far described, except for the adjustment in time T5 when two high current pulses are employed or time T6 when three high current pulses are employed, the spatter control concept of FIG. 2 as performed by the schematically illustrated apparatus A is taught by the prior applications incorporated by reference herein.

The present invention relates to controlling termination of heat energy being applied to welding wire 10 during the arcing condition of each welding cycle. In accordance with a further aspect of the invention, switch 30 is controlled to provide a constant, instantaneous watt level during pulse 100. Both of these concepts are accomplished by the novel circuit illustrated in FIG. 3 and used to open switch SW3 when a preselected amount of energy is applied during the arc conditoin of a welding cycle. If the energy is applied by a third high current section as discussed above, the time when switch SW4 opens can be controlled by the circuit of FIG. 3. Multiplier 120 creates a signal in line 130 which is proportional to the product of the arc voltage level on line 122 and the welding current level on line 124. These levels are voltage levels sensed by appropriate devices to measure the total voltage across extension and the current flow through the welding operation as controlled by high frequency current pulses through power switch 30. Output line 130 of multiplier 120 is directed to the input of an integrator 150. Thus, the instantaneous watt signal in line 130 is integrated in a single welding cycle during the portion of the welding cycle determined by the operation of switch 152. In the preferred embodiment of the invention, switch 152 is closed between times T3 and T5 so that the accumulated energy as a D.C. level on line 154 is totalized between times T3-T5. The accumulated energy $E_T$ on line 154 could be used to directly stop the current flow to the welding operation whenever the totalized, accumulated energy for a given cycle $E_T$ equals a reference energy $E_R$. This reference energy is just slightly over the amount of energy needed to melt a ball of the desired size on the end of wire 10. Thus, integrator 150 could produce an accumulated or totalized energy signal or voltage level on line 154 which is directly employed for the purpose of toggling a timer to shift switch 130 to a background control circuit C4 through switch SW4, as shown in FIG. 1. This concept uses the condition "(a)" on FIG. 3. Pulse TP in FIG. 4 is the output of the circuit shown in FIG. 3. If a third current pulse were to be employed, the condition "(b)" could be utilized wherein switch 152 is operative between times T3-T6. Then, the totalized or accumulated energy on line 154 would control the position of time T6. If desired, the total energy, even including the PINCH circuit, could be employed by integrating the instantaneous watt signal in line 130 between times T1-T6. This is condition "(c)" and is not employed in the two preferred embodiments of the present invention.

Figure 5:
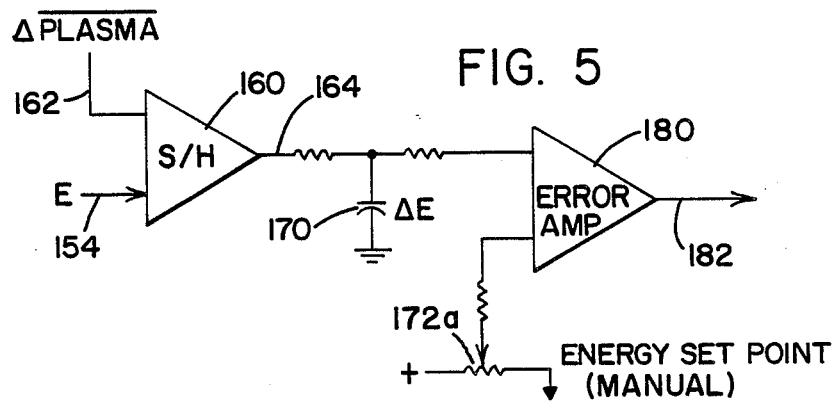
FIG. 5 is a simplified view of a portion of the wiring diagram illustrated in FIG. 3 and showing the sample and hold feature.

As so far explained, the total energy is applied as a voltage level on line 154 during each welding cycle to provide a signal representing the accumulated amount of energy applied to the welding wire during the plasma boost current pulse 100 and the plasma current pulse 110, as illustrated in FIG. 2. This voltage level on line 154 is applied to the input of a sample and hold circuit 160 shown in both FIG. 3 and FIG. 5. A logic on line 162 samples and holds the accumulated energy determined by a voltage level on line 154 at the end of a plasma current pulse 110. This voltage level is held on line 164 which has a scale of 0.2 volts for each 2.0 Joules of energy accumulated in accordance with the voltage level on line 154. The voltage level held on line 154 is directed to an accumulating capacitor 170 forming a voltage divider with rheostat 172 which is employed for the purpose of setting the energy set point $E_R$. In this manner, an essentially D.C. signal or voltage level is applied to the control terminal of error amplifier 180. This provides a smoother operation than using a signal which shifts between zero energy and accumulated energy during each cycle.

At the output of error amplifier 180 is a variable voltage level in output line 182 applied to time delay capacitor 184 of a time delay circuit 190. The voltage on line 182 determines the voltage of capacitor 184 for controlling the time between the closing of switch SW2 to start the plasma boost at T3 and the opening of switch SW3 at time T5 for shifting the pulse switch modulator 32 into the background current mode for operating power switch 30. Thus, the pulse switch modulator maintains control by the plasma boost control and then by the plasma control itself until output 192 of time delay device 190 terminates the plasma control operation at time T5. This creates a time delay signal wherein the accumulated energy during a cycle equals $E_T$ the reference energy $E_R$, which reference energy is only slightly above the energy necessary to melt the last increment of the wire by a combined resistance heating and arc or anode heating.

Figure 6:
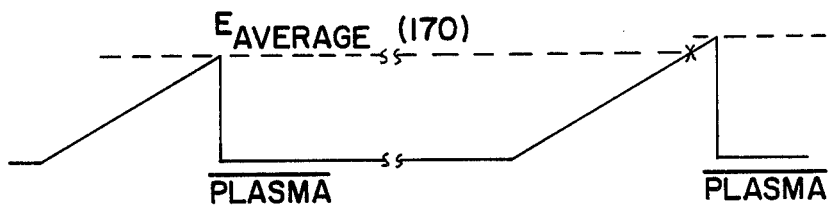
FIG. 6 is a graph showing an operating characteristic of the circuit shown in FIG. 5.
Figure 7:
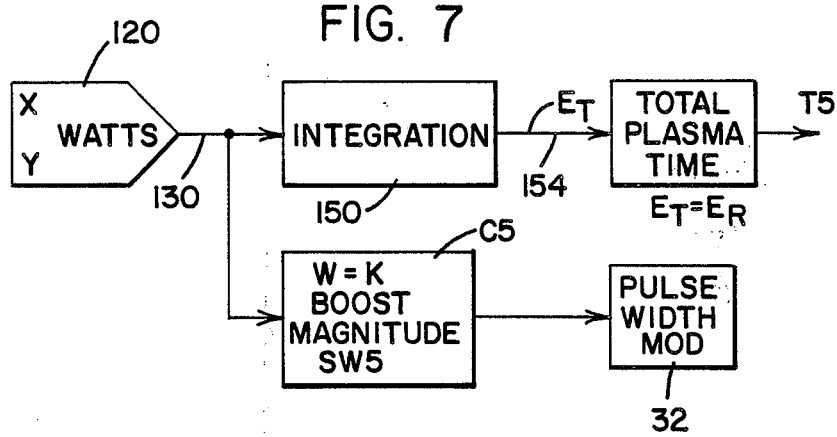
FIG. 7 is a block diagram showing the dual application of the watt output signal created in accordance with the preferred embodiment of the present invention.

As illustrated in FIG. 7, the total energy $E_T$ can be compared to the reference energy $E_R$ for the purpose of terminating the plasma pulse at time T5. In accordance with the invention, the accumulated energy $E_T$ is maintained constant by causing T5 to occur when the accumulated energy reaches the reference energy. The means for accomplishing this function, in the preferred embodiment is illustrated in FIG. 3 wherein the total accumulated energy $E_T$ at the end of the plasma pulse is sampled and transferred as a voltage level to line 164. During each cycle, this voltage either increases or decreases the voltage on capacitor 170 to raise or lower the D.C. level of line 182. Consequently, the prior accumulated energy is averaged by capacitor 170 to determine the amount of time delay for the next cycle. The voltage on capacitor 184 is reset at the end of each plasma current pulse. Error amplifier 180 is a standard device having a high gain so that variation in line 164 can be amplifier to provide the requisite scale for changing the voltage on time delay device 190. Thus, the end of the current pulse whether it includes a fixed plasma boost pulse 100 and a variable plasma pulse 110 or an additional holding pulse of high current, as explained before, will occur at a time to create a fixed constant energy input to wire 10 during the arcing condition for each cycle. Change in voltage on capacitor 170 is illustrated in FIG. 6 and indicates that the capacitor maintains a general voltage level indicative of the average accumulated energy per cycle from prior welding cycles. Each cycle, thus, changes only slightly the average energy on capacitor 170. This concept controls the voltage on time delay device 190 as previously described. It is equivalent to provide a control circuit as shown in FIG. 3 or a schematically illustrated circuit shown in the upper portion of FIG. 7 to provide the means for terminating the high current portion of each welding cycle to provide a constant heating energy.

The lower portion of FIG. 7 illustrates a further aspect of the preferred embodiment of the invention. Since an instantaneous watt signal is created in line 130, this watt signal can be employed for the purpose of controlling current flow allowed by switch 30 during the plasma boost pulse 100 shown in FIG. 2. Preferably the watt control operates over all of pulse 100 so portion 104 extends between times T3-T4. Line 130 is directed to the watt control circuit C5 at the input side of switch SW5 shown in FIG. 1 so that the pulse width modulator 32 is controlled by the output of switch SW5 instead of the output of the current control switch SW6. Consequently, in accordance with this aspect of the invention, the current through switch 30 during the plasma boost pulse is controlled to maintain a constant instantaneous watt. This overcomes the disadvantages previously discussed with respect to using constant voltage during the plasma boost current pulse or using variable voltage with a constant current condition during this high energy pulse. Thus, the high energy applied to the wire at the plasma boost current pulse 100 is controlled to prevent the arc from driving the pool away from the ball or allowing the pool to engage the molten metal ball randomly. This is a further advantage of the present invention.

Figure 10:
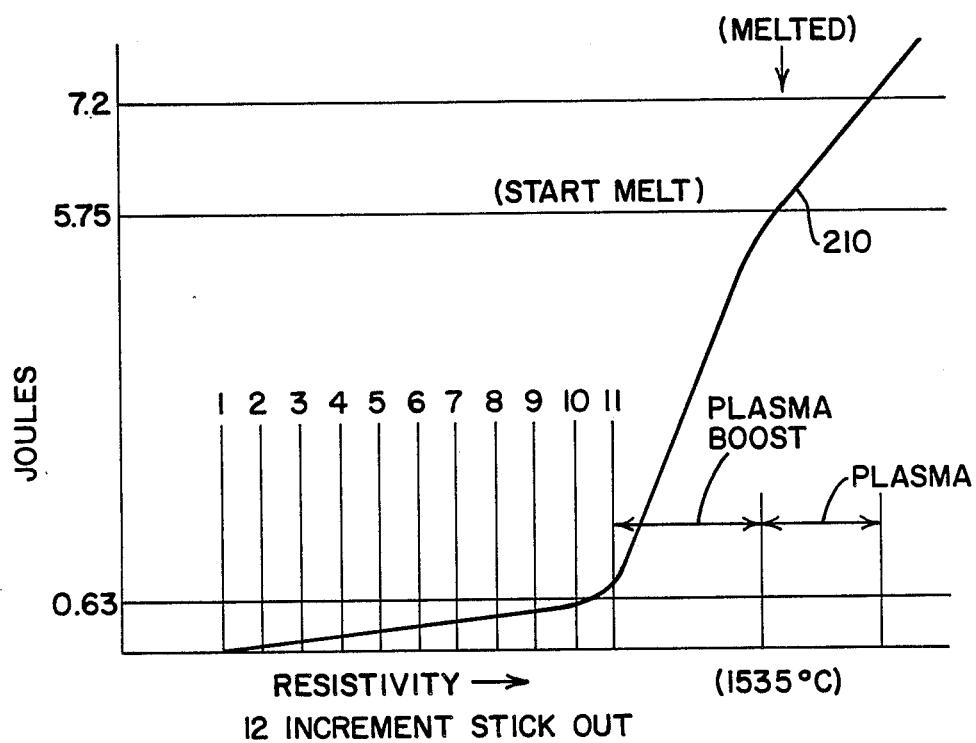
Figure 8:
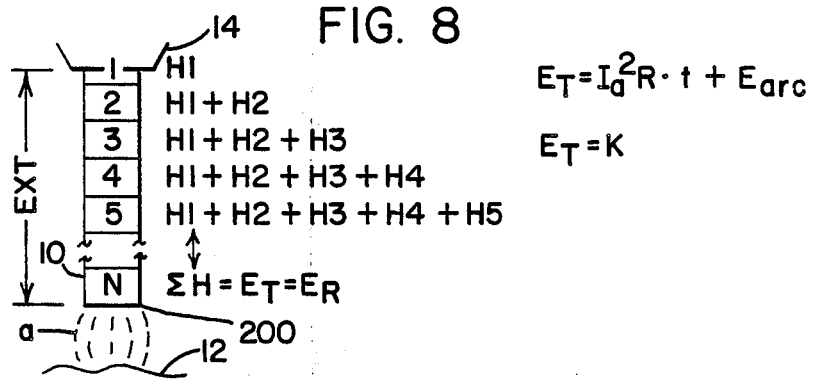
FIG. 8 is a side view with certain labels used to explain an operating characteristic, in increment format, of the present invention.

Referring now to FIGS. 8-10, operating characteristics of the present invention are graphically illustrated. The extension from wire holder 14 is shown schematically in FIG. 8 as being divided into a series of individual increments, each of which is equal to the volume of metal melted at the end of wire 10 to form a ball B as shown in FIG. 9. This ball has an effective diameter of about 1.2 times the diameter of wire 10. During each welding cycle the last increment, i.e. increment 1, is raised to the melting temperature of about 1535° C. by a combined heating effect caused by the heat accumulated by increment 1 as it moved down from holder 14 and the heat created by anode heating of arc a at anode area 200. In accordance with the invention, the total energy $E_T$ in the current welding cycle is constant and is controlled at a value $E_R$ which value will bring the temperature of the metal in increment 1 to the molten temperature. During this heating in a single welding cycle, increment 1 is melted and the trailing increments are heated by an $I^2R$ heating effect. Thus, the total heat created in a given welding cycle is distributed between anode heating at anode area 200 and resistance heating through all increments extending to holder 14. As more increments are included when the stick-out increases, total resistance increases to shift more heating into the resistance heating component. Since resistivity increases with temperature more resistance is contributed by the heating of the lower increments. The energy constant of the last increment at the end of the wir is the summation of the resistance heating occurring during successive welding cycles as a particular increment progresses downwardly. Assuming that the stick-out or extension remains constant, the total heat in the last increment before it is subjected to anode heating containing heat which is essentially the accumulated resistance heating during prior heating cycles. This is, when disregarding the slight resistance changes, the resistance heating per cycle times the stick-out increments. In view of this phenomenon, the total heat energy directed to the wire during a welding cycle is divided between anode heating and resistance heating. The accumulated resistance heating of an increment as it progresses downwardly is the residual energy of the last increment. The resistance heating of all increments in a cycle is essentially equal to the difference between the anode heating and the total energy applied between times T3-T5. Thus, by keeping the total energy constant between times T3-T5, there is always a controlled energy applied by the accumulated resistance heating and by the heating of the cycle being performed to raise the temperature of increment 1 to a fixed, selected total energy $E_T$.

Welding cycles occur between 30-100 times a second and the current is controlled during a welding cycle at a rate of 20 KHz, as indicated by vertical lines P of the current graph in FIG. 2. Consequently, individual increments move from holder 14 at a rate of 30-100 per second. This rate is substantially faster than any normal changes occurring in the stick-out by manual manipulation of the holder 14 during the welding operation. Thus, as the stick-out or extension changes, the phenomena created by controlling the total accumulated energy $E_T$ during the arcing condition of a given cycle does not vary accordingly. Different accumulated resistance heating occurs substantially slower than any changes in the number of increments. For that reason, in the example of FIG. 8, heat H1, equals H2, equals H3, equals H4, equals H5, etc. Thus, the summation of energy in increment 1 preparatory to being melted is essentially the total resistance heating of the last welding cycle even through it has been applied to increment 1 incrementally over the last several cycles.

An example showing this distribution between resistance heating and anode heating as the number of stick-out increments change is set forth below:

EXAMPLE

| | |
|---|---|
| Electrode dia. | 0.045 in. |
| Electrode speed | 101 in/min. |
| Stick out | 0.48 in |
| Frequency | 62 Hz |
| Increment | .0268 in |
| Standard increments | 17 |
| Standard plasma time | 0.00089 sec. |
| Plasma current | 160 amp. |
| Plasma boost current | 330 amp. |
| Plasma boost time | 0.00140 sec. |

| Increments in Total Heating | Accumulated Resistance Heating in Last Increment Joules | Anode Heating Joules | Total (Set) Heating Joules (Cycles) Melt 7.2 Joules |
|---|---|---|---|
| 4 | 0.1997 | 7.0704 | 7.2701 |
| 6 | 0.3138 | 6.9563 | 7.2701 |
| 8 | 0.4372 | 6.8329 | 7.2701 |
| 10 | 0.5691 | 6.7010 | 7.2701 |
| 12 | 0.7088 | 6.5613 | 7.2701 |
| 14 | 0.8550 | 6.4151 | 7.2701 |
| 16 | 1.0066 | 6.2635 | 7.2701 |
| *17 | 1.0839 | 6.1862 | 7.2701 |
| 18 | 1.1639 | 6.1062 | 7.2701 |
| 20 | 1.3364 | 5.9337 | 7.2701 |
| 22 | 1.5164 | 5.7537 | 7.2701 |
| 24 | 1.7004 | 5.5697 | 7.2701 |

At any given cycle, the total resistivity heating in Joules for the increment being heated is equal to the total resistance heating of the present cycle. By controlling the total set point energy $E_T$, the anode heating, in Joules, for each welding cycle, added to the resistance heating accumulated in the increment being melted, controls both the actual anode heating and the accumulated resistance heating of the last increment. These two heating sources for the last increment always equal the total energy $E_T$ controlled and allowed by the present invention. This concept is schematically illustrated graphically in FIG. 10 wherein an example having twelve stick-out increments is represented. For a 24 increment extension, the last increment (the increment reaching the bottom or arc position,) has an accumulated resistance heat content in this particular increment of 0.7088 Joules. Thus, by setting the reference accumulated energy $E_R$ to 7.2701, anode heating is 6.5613 Joules before cutoff of time T5 by pulse TP from delay device 190 or by real time plasma time control schematically illustrated in FIG. 7. No matter how many increments are contained in the stick-out, this principle is maintained. The total energy is the selected $E_T$ divided between resistance and anode heating. At position 12 in FIG. 10, the increment being melted will have an accumulated heat content of 0.7088 Joules by resistance heating. During the plasma boost current pulse, a fixed amount of energy is applied which fixed amount is not sufficient to melt this increment which requires 7.2 Joules. However, the total energy which is accumulated during plasma boost pulse 100 and the plasma current pulse 110 shifts the temperature of the metal through the heat of transformation area 210 so that the molten metal is formed on the end of the ball. The reference energy $E_R$ controlled during each welding cycle should only be slightly above that necessary for melting the ball. This can be done manually by an operator changing the power set point by voltage divider 172 in FIG. 3 or reference pot 172a in FIG. 5. Both of these set point circuits will allow control of the voltage level on line 182 for the purposes previously described.

In summary, by using a high frequency operated power supply and controlling the total energy for each welding cycle during the arcing condition of the cycle, the stickout or extension can vary under normal conditions without changing the welding operation. Thus, novel systems which were developed in accordance with prior efforts to reduce spatter can be equally successful for semi-automatic welding.

Since the present invention employs an instantaneous watt signal, this signal can be used to control the current 104 during the plasma boost pulse 100 to obtain a constant watt operation which overcomes disadvantages resulting in either constant voltage or constant current control during the high energy plasma boost current pulse. The various individual current control circuits shown in FIG. 1 for pinch control C1, plasma boost control C2, plasma control C3, background current whether two level or only a single low level C4 and current control C6 are used in prior systems for controlling the current for short circuiting arc welding. The present invention adds the watt control circuit C6 implemented by switch SW5 for the current control during control of the plasma boost pulse by switch SW2. This watt control concept is in accordance with an aspect of the invention.

The preferred embodiment of the invention is shown in FIG. 3 and a slight modification thereof is illustrated schematically in FIG. 7. In both instances the total energy $E_T$ resulting from both the effective current flow for anode heating and total resistance heating of the stick-out increments during each arcing condition of a welding cycle is constant.

Having thus defined the invention, the following is claimed:

1. In a short circuiting arc welding apparatus comprising a single D.C. power supply means for causing a welding current of different levels to pass through a welding wire extending variable distances from a holder and between said wire and a workpiece at a molten metal pool on said workpiece, said current flowing in response to an arc voltage, wire feeding means for feeding said wire from said holder toward said workpiece whereby said welding wire is subjected to a succession of welding cycles, each of said welding cycles including an arcing condition during which said wire is spaced from said pool and the energy applied to said wire exceeds a given value raising the temperature at the end of said wire to a molten temperature to form a molten metal ball on the end of said wire and a short circuit condition during which said molten metal ball on the end of said wire first contacts said molten metal pool and then transfers from said wire to said workpiece by a necking action breaking said molten metal ball from said wire to initiate an arc in a subsequent welding cycle, the improvement comprising: means for creating a current pulse upon initiation of said arcing condition, said current pulse having a first occurring plasma boost portion with a current increasing to a first general current level and a second occurring plasma portion with a second general current level, means for totalizing the energy applied to said wire during said current pulse of a welding cycle, means for terminating said current pulse of the welding cycle when the totalized energy reaches a preselected value greater than said given value, and means for applying a low level background current between said wire and said workpiece after termination of said current pulse and until the next short circuit condition of said welding cycle.

2. The improvement as defined in claim 1 wherein said energy totalizing means comprises means for creating a watt signal as the instantaneous product of said arc voltage and said welding current and means for integrating said watt signal at least during said current pulse to provide a signal indicative of the energy applied to said wire as said current pulse progresses.

3. The improvement as defined in claim 2 including means for adjusting said first general current level to maintain said watt signal at a generally constant value during said first portion of said pulse.

4. The improvement as defined in claim 3 wherein said adjusting means includes a pulse width modulator chopper circuit to control said power supply and means for changing the pulse width of said chopper circuit in response to deviations of said watt signal from said generally constant value.

5. The improvement as defined in claim 4 wherein said first occurring portion of said current pulse has a fixed duration.

6. The improvement as defined in claim 3 wherein said first occurring portion of said current pulse has a fixed duration.

7. The improvement as defined in claim 2 including means for adjusting said first general current level to maintain a constant current level during said first portion of said pulse.

8. The improvement as defined in claim 7 wherein said adjusting means includes a pulse width modulator chopper circuit to control said power supply and means for changing said pulse width of said chopper circuit in response to deviations of said first general current level from said constant current level.

9. The improvement as defined in claim 7 wherein said first occurring portion of said current pulse has a fixed duration.

10. The improvement as defined in claim 2 wherein said current pulse includes a third occurring portion after said second occurring portion.

11. The improvement as defined in claim 10 wherein said first occurring portion of said current pulse has a fixed duration.

12. The improvement as defined in claim 11 wherein said second occurring portion of said current pulse has a fixed duration.

13. The improvement as defined in claim 2 wherein said first occurring portion of said current pulse has a fixed duration.

14. The improvement as defined in claim 2 wherein said welding cycles have a generally fixed frequency of repetition and said power supply includes means for applying a succession of input current pulses across said wire and workpiece at a pulse frequency substantially greater than said frequency of repetition and pulse width changing means for adjusting current flow between said wire and said workpiece during said welding cycle.

15. The improvement as defined in claim 14 wherein said pulse frequency is greater than 10 KHz.

16. The improvement as defined in claim 15 wherein said pulse frequency is approximately 20 KHz.

17. The improvement as defined in claim 14 including a switch means for directing said input pulses across said wire and said workpiece, a high impedance branch circuit in parallel with said switch and means for opening said switch during said short circuit condition immediately before said molten metal ball is broken to initiate said arc.

18. The improvement as defined in claim 1 including means for adjusting said first general current level to maintain said watt signal at a generally constant value during said first portion of said pulse.

19. The improvement as defined in claim 18 wherein said adjusting means includes a pulse width modulator chopper circuit to control said power supply and means for changing the pulse width of said chopper circuit in response to deviations of said watt signal from said generally constant value.

20. The improvement as defined in claim 18 wherein said first occurring portion of said current pulse has a fixed duration.

21. The improvement as defined in claim 1 including means for adjusting said first general current level to maintain a constant current level during said first portion of said pulse.

22. The improvement as defined in claim 21 wherein said adjusting means includes a pulse width modulator chopper circuit to control said power supply and means for changing said pulse width of said chopper circuit in response to deviations of said first general current level from said constant current level.

23. The improvement as defined in claim 1 wherein said current pulse includes a third occurring portion after said second occurring portion.

24. The improvement as defined in claim 23 wherein said first occurring portion of said current pulse has a fixed duration.

25. The improvement as defined in claim 24 wherein said second occurring portion of said current pulse has a fixed duration.

26. The improvement as defined in claim 1 wherein said first occurring portion of said current pulse has a fixed duration.

27. The improvement as defined in claim 1 including means for inhibiting said totalizing means during said short circuit condition of said welding cycle.

28. The improvement as defined in claim 1 wherein said welding cycles have a generally fixed frequency of repetition and said power supply includes means for applying a succession of input current pulses across said wire and workpiece at a pulse frequency substantially greater than said frequency of repetition and pulse width changing means for adjusting current flow between said wire and said workpiece during said welding cycle.

29. The improvement as defined in claim 28 wherein said pulse frequency is greater than 10 KHz.

30. The improvement as defined in claim 29 wherein said pulse frequency is approximately 20 KHz.

31. The improvement as defined in claim 28 including a switch means for directing said input pulses across said wire and said workpiece, a high impedance branch circuit in parallel with said switch and means for opening said switch during said short circuit condition immediately before said molten metal ball is broken to initiate said arc.

32. In a short circuiting arc welding apparatus comprising a single D.C. power supply means for causing a welding current of different levels to pass through a welding wire extending variable distances from a holder and between said wire and a workpiece at a molten metal pool on said workpiece, said current flowing in response to an arc voltage whereby said welding wire is subjected to a succession of welding cycles, each of said welding cycles including an arcing condition during which said wire is spaced from said pool and the energy applied to said wire exceeds a given value raising the temperature at the end of said wire to a molten temperature to form a molten metal ball on the end of said wire and a short circuit condition during which said molten metal ball on the end of said wire first contacts said molten metal pool and then transfers from said wire to said workpiece by a necking action breaking said molten metal ball from said wire to initiate an arc in a subsequent welding cycle, the improvement comprising: means for applying a preselected energy to said wire during a selected initial portion of each arcing condition of said welding cycle, said preselected energy exceeding said given value by a preselected amount.

33. The improvement as defined in claim 32 including means for creating a signal representing the instantaneous watt applied to said wire during said selected portion of said arcing condition, means for integrating said watt signal, means for totalizing said integrated watt signal and means for shifting said power supply to a background holding condition when said totalized integrated watt signal reaches said preselected energy.

34. The improvement as defined in claim 33 wherein said power supply includes a D.C. chopper circuit having a current output controlled by a pulse width modulator, means for operating said pulse width modulator at a frequency greater than 10 KHz, and means for reducing the welding current to said wire by reducing the width of the current pulses passed by said pulse width modulator when said totalized integrated watt signal reaches said preselected energy.

35. The improvement as defined in claim 34 including means for controlling the welding current during a given portion of said arcing condition for holding said watt signal at a fixed value.

36. The improvement as defined in claim 33 including means for controlling the welding current during a given portion of said arcing condition for holding said watt signal at a fixed value.

37. The improvement as defined in claim 32 including means for maintaining a generally constant watt level during at least a part of said selected portion of each of said welding cycles.

38. A method for short circuiting arc welding using a single D.C. power supply means for causing a welding current of different levels to pass through a welding wire extending variable distances from a holder and between said wire and a workpiece at a molten metal pool on said workpiece, said current flowing in response to an arc voltage, and said welding wire being subjected to a succession of welding cycles, each of said welding cycles including an arcing condition during which said wire is spaced from said pool and the energy applied to said wire exceeds a given value raising the temperature at the end of said wire to a molten temperature to form a molten metal ball on the end of said wire and a short circuit condition during which said molten metal ball on the end of said wire first contacts said molten metal pool and then transfers from said wire to said workpiece by a necking action breaking said molten metal ball from said wire to initiate an arc in a subsequent welding cycle, said method comprising the steps of:

(a) creating a current pulse upon initiation of said arcing condition, said current pulse having a first occurring plasma boost portion with a current increasing to a first general current level and a second occurring plasma portion with a second general current level;

(b) totalizing the energy applied to said wire during said current pulse of a welding cycle;

(c) terminating said current pulse of the welding cycle at a time causing the totalized energy to reach a preselected value greater than said given value; and, (d) applying a low level background current between said wire and said workpiece until the next short circuit condition of said welding cycle.

39. The method as defined in claim 38 wherein said energy totalizing step includes the further steps of:

(e) creating a watt signal as the instantaneous product of said arc voltage and said welding current; and, (f) integrating said watt signal at least during said current pulse to provide a signal indicative of the energy applied to said wire as said current pulse progresses.

40. The method as defined in claim 39 including the further steps of:

(g) adjusting said first general current level to maintain said watt signal at a constant value during said first portion of said pulse.

41. The method as defined in claim 40 wherein said adjusting step includes the further step:

(h) providing a pulse width modulator chopper circuit to control said power supply; and, (i) changing the pulse width of said chopper circuit in response to deviations of said watt signal from said constant value.

42. In a short circuiting arc welding apparatus comprising a single D.C. power supply means for causing a welding current of different levels to pass through a welding wire extending variable distances from a holder and between said wire and a workpiece at a molten metal pool on said workpiece, said current flowing in response to an arc voltage whereby said welding wire is subjected to a succession of welding cycles, each of said welding cycles including an arcing condition during which said wire is spaced from said pool and the energy applied to said wire exceeds a given value raising the temperature at the end of said wire to a molten temperature to form a molten metal ball on the end of said wire and a short circuit condition during which said molten metal ball on the end of said wire first contacts said molten metal pool and then transfers from said wire to said workpiece by a necking action breaking said molten metal ball from said wire to initiate an arc in a subsequent welding cycle, the improvement comprising: means for creating a plasma boost current pulse at the start of the arcing condition of said welding cycle and means for controlling said welding current during said plasma boost current pulse to provide a constant watt value during said plasma boost current pulse.

43. The improvement as defined in claim 42 wherein said welding current controlling means is a pulse width modulator, D.C. chopper means for directing several pulses of current across said wire and workpiece during said plasma boost current pulse.

44. The improvement as defined in claim 43 wherein said current controlling means includes means for controlling said welding current during said plasma boost current pulse to provide a plasma umbrella arc.

45. The improvement as defined in claim 42 wherein said current controlling means includes means for controlling said welding current during said plasma boost current pulse to provide a plasma umbrella arc.

* * * * *

UNITED STATES PATENT AND TRADEMARK OFFICE
CERTIFICATE OF CORRECTION

PATENT NO. : 4,866,247

DATED : September 12, 1989

INVENTOR(S) : John M. Parks; Elliott K. Stava

It is certified that error appears in the above-identified patent and that said Letters Patent is hereby corrected as shown below:

Column 3, line 18, "wiring" should read --- wire ---. Column 5, line 59, "welded" should read --- welding ---. Column 6, line 28, "for" should read --- from ---; line 58, "employed" should read --- employ ---. Column 7, line 62, "12" should read --- 10 ---. Column 9, line 48, cancel "control" (second occurrence). Column 10, line 29, "portion" should read --- portions ---. Column 11, line 31, "130" should read --- 30 ---. Column 12, lines 4 and 6, "switch" should read --- width ---; line 34, "amplifier" should read --- amplified ---. Column 13, line 38, "wir" should read --- wire ---. Column 15, line 15 "pot" should read --- point ---.

Signed and Sealed this

Twenty-fifth Day of February, 1992

Attest:

HARRY F. MANBECK, JR.

*Attesting Officer*     *Commissioner of Patents and Trademarks*